United States Patent
Lei

(10) Patent No.: US 10,209,048 B2
(45) Date of Patent: Feb. 19, 2019

(54) DOUBLE BALL-BAR MEASURING SYSTEM AND ERRORS COMPENSATION METHOD THEREOF

(71) Applicant: NATIONAL TSING HUA UNIVERSITY, Hsinchu (TW)

(72) Inventor: Wei-Tai Lei, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 315 days.

(21) Appl. No.: 15/365,898

(22) Filed: Nov. 30, 2016

(65) Prior Publication Data

US 2017/0153102 A1 Jun. 1, 2017

(30) Foreign Application Priority Data

Dec. 1, 2015 (TW) .............................. 104140229 A

(51) Int. Cl.
 *G01B 5/00* (2006.01)
 *G01B 21/04* (2006.01)
 *G01D 5/244* (2006.01)
 *G01D 5/347* (2006.01)

(52) U.S. Cl.
 CPC ......... *G01B 5/0014* (2013.01); *G01B 21/042* (2013.01); *G01B 21/045* (2013.01); *G01D 5/24452* (2013.01); *G01D 5/34753* (2013.01)

(58) Field of Classification Search
 CPC .. G01B 21/042; G01B 21/045; G01B 5/0014; G01D 5/24452; G01D 5/34753
 USPC .......................................................... 33/702
 See application file for complete search history.

(56) References Cited

U.S. PATENT DOCUMENTS

| | | | |
|---|---|---|---|
| 5,028,180 A | 7/1991 | Sheldon et al. | |
| 5,604,593 A | 2/1997 | McMurtry | |
| 5,681,981 A * | 10/1997 | McMurtry | B23Q 1/5462 |
| | | | 33/502 |
| 5,870,834 A | 2/1999 | Sheldon | |
| 5,909,939 A | 6/1999 | Fugmann | |
| 6,498,653 B1 | 12/2002 | Wang | |
| 6,772,619 B2 * | 8/2004 | Nashiki | B25J 9/1692 |
| | | | 33/502 |
| 7,520,156 B2 | 4/2009 | Matsushita | |
| 7,659,682 B2 | 2/2010 | Matsumoto et al. | |
| 7,841,097 B2 * | 11/2010 | Evans | B25J 17/0216 |
| | | | 33/502 |

(Continued)

FOREIGN PATENT DOCUMENTS

| | | |
|---|---|---|
| CN | 101239469 A | 8/2008 |
| JP | 2002-96232 A | 4/2002 |
| JP | 2005-103720 A | 4/2005 |

*Primary Examiner* — Yaritza Guadalupe
(74) *Attorney, Agent, or Firm* — CKC & Partners Co., Ltd.

(57) ABSTRACT

A double ball-bar measuring system includes a calibration unit, at least two double ball-bars and a measuring module. Among the double ball-bars, at least one is a measuring double ball-bar and at least one is a reference double ball-bar. The measuring double ball-bar is installed on a measurement apparatus to measure or calibrate a target machine. The reference double ball-bar is disposed on the calibration unit to measure thermal errors. When the target machine is driven for measurement or calibration, the geometric and thermal errors of the measuring double ball-bar are compensated so that the measurement apparatus can achieve highly accurate measurement.

27 Claims, 12 Drawing Sheets

(56) References Cited

U.S. PATENT DOCUMENTS

| | | | |
|---|---|---|---|
| 2003/0070311 A1* | 4/2003 | Zhu | G01B 21/042 33/502 |
| 2005/0018205 A1* | 1/2005 | Braasch | G01B 11/02 356/498 |
| 2009/0194664 A1* | 8/2009 | Evans | B25J 17/0216 248/670 |
| 2017/0153102 A1* | 6/2017 | Lei | G01B 5/0014 |

* cited by examiner

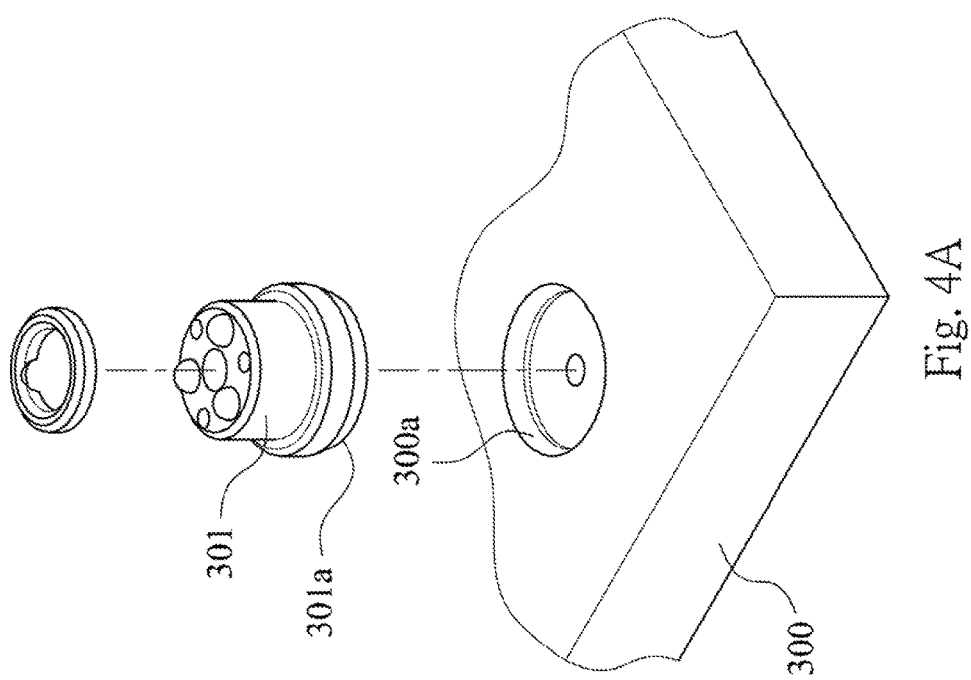

DOUBLE BALL-BAR MEASURING SYSTEM AND ERRORS COMPENSATION METHOD THEREOF

RELATED APPLICATIONS

This application claims priority to Taiwan Application Serial Number 104140229, filed Dec. 1, 2015, which is herein incorporated by reference.

BACKGROUND

Technical Field

The present disclosure relates to double ball-bars in measurement apparatuses and in particular to the compensation of geometric and thermal errors of double ball-bars in hexapod measurement apparatuses or machines.

Description of Related Art

A double ball-bar has precision ball and socket joints at its two ends. It is used to measure the absolute bar length or the change of bar length between the two precision balls. Its applications can be found in both machine tools and hexapod coordinate measurement machines. The displacement sensor for a double ball-bar includes linear variable differential transformer (LVDT), laser interferometer, linear magnetic encoder and linear optical encoder, and the measurement principle can be either incremental or absolute.

In the present disclosure, the distance between the centers of the two connected ball and socket joints is defined as the center distance. Like any other precision machines, the double ball-bar also has geometric and thermal errors. One example of the geometric errors is the misalignment between the sensor measuring direction and the center line connecting the two ball centers. Another geometric error is the deflection of the double ball-bar due to the gravitational force. When a double ball-bar has stiffness problem and becomes curved due to its own weight, the difference between bar length and center distance is not ignorable. For a highly accurate double ball-bar, the displacement sensor is meant to measure the center distance, not the bar length. Further, the accuracy of a double ball-bar is sensitive to ambient temperature. The measurement apparatus or machine may be used in a workshop without temperature control. A change in ambient temperature will cause the double ball-bar to expand or contract between the two ball and socket joints, which results in thermal errors in the measured center distance.

Investigations have shown that the readhead of an optical linear encoder or a magnetic linear encoder is also a heat source and may cause thermal error in the double ball-bar. Although the power of the electrical circuit in the readhead is low, the generated heat may raise the temperature of the readhead and the neighboring elements notably as their mass is small.

Because of the geometric and thermal errors, the relationship between the center distance and the measured displacement amount is non-linear and time-variant. For highly accurate applications like hexapod measurement apparatuses or machines, it is important to identify these errors and to compensate them.

SUMMARY

The disclosed double ball-bar measuring system overcomes the above mentioned problems compared to prior art and provides highly accurate double ball-bars for measurement apparatuses, in particular hexapod measurement apparatuses or machines. According to one embodiment of the present disclosure, the double ball-bar system includes a calibration unit, at least two double ball-bars and a measuring module. Among the double ball-bars, at least one double ball-bar is a measuring double ball-bar and at least one double ball-bar is a reference double ball-bar. The calibration unit includes at least three supporting members and provides at least two reference center distances. The measuring double ball-bar is installed on a measurement apparatus to measure or to calibrate a target machine. The reference double ball-bar is disposed on two of the at least three supporting members of the calibration unit.

When the target machine is driven for measurement or calibration, the measuring double ball-bar measures a displacement amount and the reference double ball-bar measures a thermal error amount. The measuring module processes the displacement amount and the thermal error amount, compensates the geometric and thermal errors of the measuring double ball-bar and performs measurement data processing.

According to another embodiment of the present disclosure, an errors compensation method of the double ball-bar measuring system includes the following steps. A calibration unit is provided which comprises at least three supporting members and provides at least two reference center distances. At least two double ball-bar are provided, wherein at least one double ball-bar is a measuring double ball-bar and at least one double ball-bar is a reference double ball-bar. The measuring double ball-bar is disposed on the calibration unit to measure at least two calibration points. A center distance function of the measuring double ball-bar is established in accordance with the calibration points. The measuring double ball-bar is installed on a measurement apparatus to measure or to calibrate a target machine. The reference double ball-bar is disposed on the calibration unit. The target machine is driven for a measurement or a calibration. The measuring double ball-bar measures a displacement amount and the reference double ball-bar measures a thermal error amount. A center distance of the measuring double ball-bar is determined in accordance with the center distance function and the displacement amount. The center distance is compensated in accordance with the thermal error amount. The compensated center distance is used for further measurement data processing.

BRIEF DESCRIPTION OF THE DRAWINGS

Embodiments of the disclosure will now be described in more detail, with reference to the accompanying drawings in which:

FIG. 4A is a schematic view of a supporting member disposed on the calibration unit according to the embodiment of FIG. 3.

DETAILED DESCRIPTION

Figure 1:
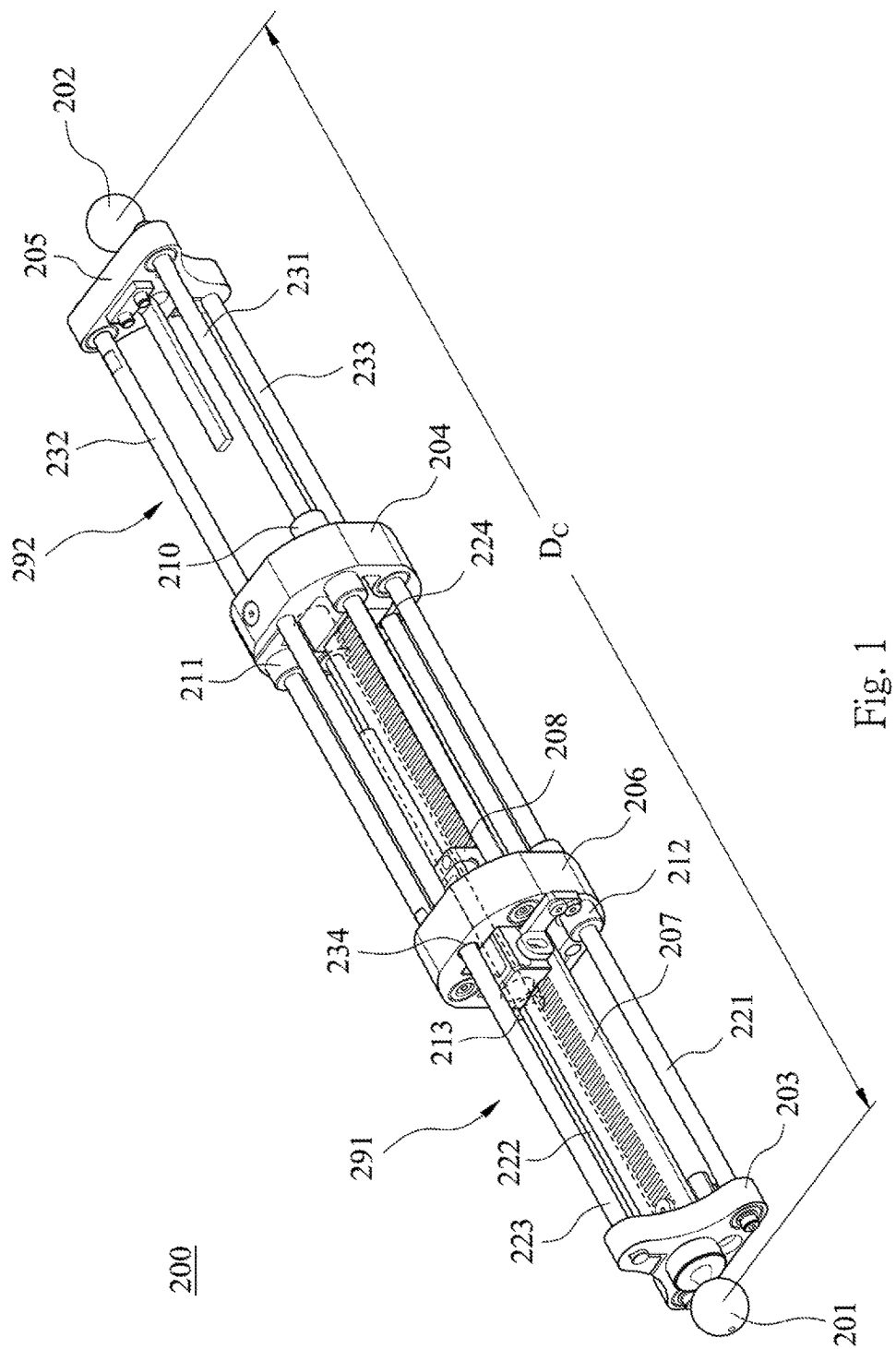
FIG. 1 is a three dimensional view of a double ball-bar which is applied to a double ball-bar measuring system according to one embodiment of the present disclosure.

FIG. 1 is a three dimensional view of a double ball-bar 200, which is used in a double ball-bar measuring system 100 (labeled in FIG. 5) according to one embodiment of the present disclosure. In the embodiment of FIG. 1, the double ball-bar 200 uses a relative linear optical encoder as displacement sensor and includes two assemblies, the scale assembly 291 and the readhead assembly 292. Each assembly includes a ball base, a guiding base and at least three parallel connecting bars.

Among the parallel connecting bars of one assembly, at least two are guiding bars fitting with linear bearings on the other assembly. In the embodiment of FIG. 1, the scale assembly 291 includes a ball base 203, a guiding base 204, an optical scale 207 and three connecting bars 221, 222 and 223. The ball base 203 carries a measuring ball 201. The connecting bars 221 and 222 are guiding bars and the connecting bar 223 is a tension bar.

The readhead assembly 292 includes a ball base 205, a guiding base 206, a readhead 208 and three connecting bars 231, 232 and 233. The ball base 205 carries a measuring ball 202. The connecting bars 231 and 232 are guiding bars and the connecting bar 233 is a tension bar. The guiding base 204 has two linear bearings 210 and 211 and a hole 224, wherein the two guiding bars 231 and 232 pass through the linear bearings 210 and 211, respectively, and the tension bar 233 passes through the hole 224. The tension bar 233 and the guiding base 204 are separated by a gap between the hole 224 and the tension bar 233. The guiding base 206 includes two linear bearings 212 and 213 and a hole 234 for being passed through by the two guiding bars 221 and 222 and the tension bar 223, respectively. The tension bar 223 and the guiding base 206 are separated by a gap between the tension bar 223 and the hole 234.

As a whole, four parallel guiding bars 221, 222, 231, 232 are arranged between the two guiding bases 204 and 206. The center line of the double ball-bar, which is the line between the centers of the two measuring balls 201 and 202, is on the upper surface of the optical scale 207 to avoid Abbe error. Besides, the structure of the scale assembly 291 and the readhead assembly 292 keeps weight low and has high area moment of inertia and high bending stiffness to avoid geometric error resulting from the ball-bar deflection. Other advantages of the arrangement regarding the thermal behavior of the double ball-bar 200 will be described in more detail below with reference to FIG. 6A-6C.

The center distance $D_c$ of the double ball-bar 200 is the distance between the centers of the two measuring balls 201 and 202. To reduce the thermal error, the elements effecting the center distance, such as the guiding bars 221, 222, 231, 232, the tension bars 223, 233 and the scale, are made of materials of low or near-zero coefficient of thermal expansions, for example INVAR®, Super INVAR®, ZERODUR® or quartz glass. In contrast, the ball bases 203, 205 and the guiding bases 204, 206 may be made of aluminum alloy to reduce weight. The measuring balls 201, 202 are made of magnetic stainless steel so that they can be attracted to ball sockets. At room temperature, the coefficient of thermal expansion of INVAR® is around 1.5-2.0 ppm/° C., Super INVAR® around 0.63 ppm/° C., quartz glass 0.5 ppm/° C. and ZERODUR® 0-0.1 ppm/° C.

Figure 2:
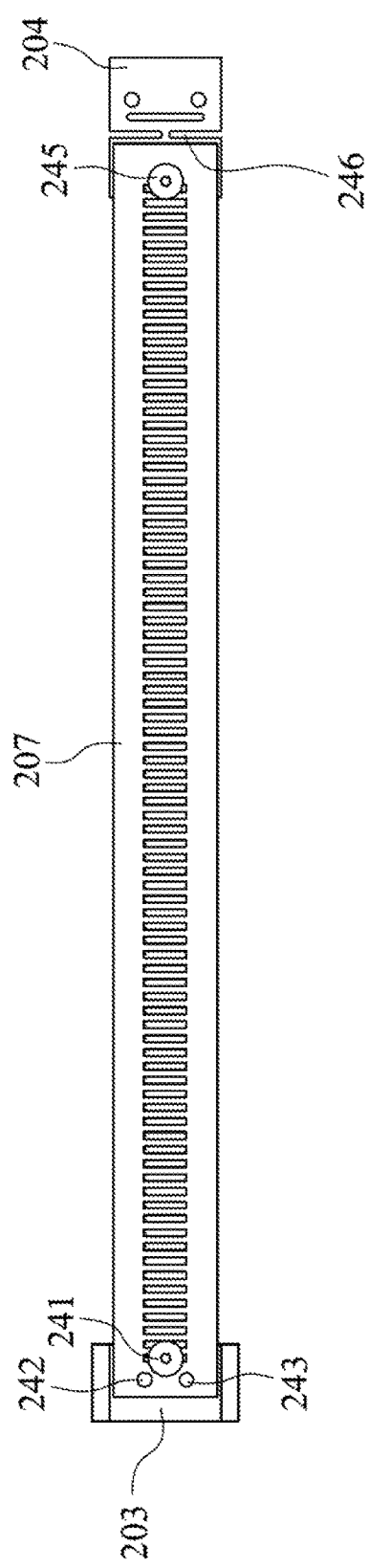
FIG. 2 is a schematic view of an optical linear scale of the double ball-bar in FIG. 1.

FIG. 2 is a schematic view of the optical linear scale 207 of the double ball-bar 200 in FIG. 1. In FIG. 2, the first end of the optical linear scale 207 is fixed on the ball base 203 by a screw 241 and two locating pins 242 and 243. If the linear scale 207 and the connecting bars 221,222,223 are made of different materials, their thermal expansions will be different. It is important to provide a stress absorbing means to allow the second end of the optical linear scale 207 to expand or to contract relative to the guiding base 206, otherwise thermally induced stress may occur in the scale assembly 291. The stress absorbing means can be an elastic element or a form-fit element. In FIG. 2, the second end of the optical linear scale 207 is fixed on an axially deformable flexure 246 which absorbs the difference of thermal expansions. The flexure can also be arranged in a direction perpendicular to the optical linear scale 207. The thermal behavior of the double ball-bar having a stress absorbing means will be described in more detail below with reference to FIG. 6A-6C.

Figure 3:
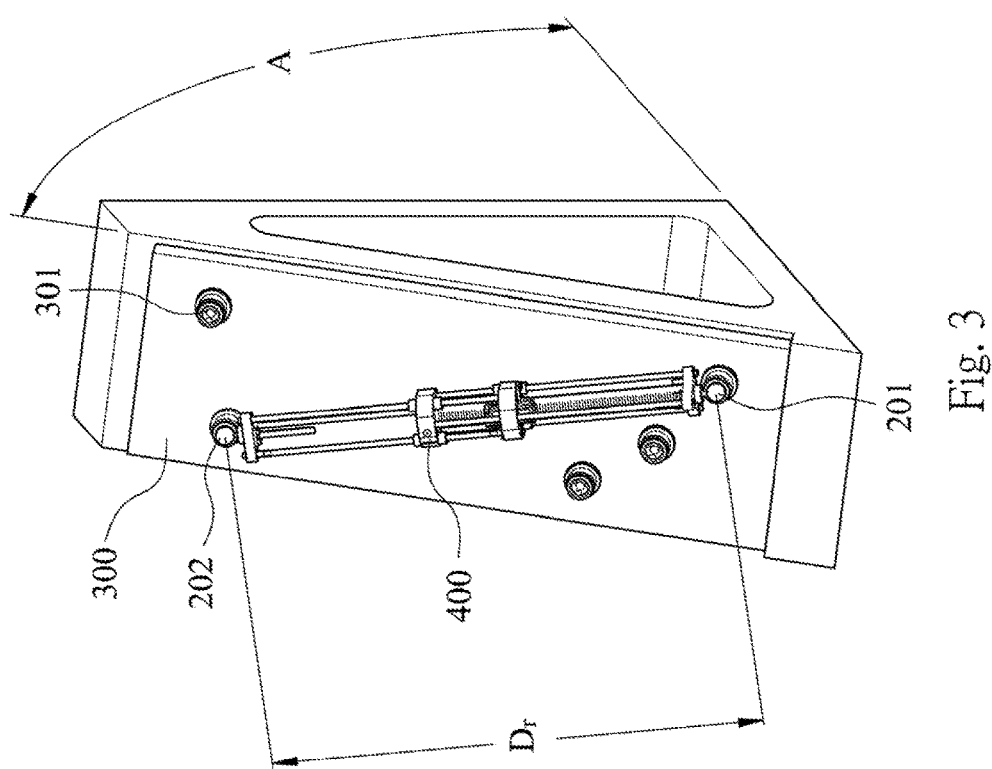
FIG. 3 is a schematic view of a calibration unit of the double ball-bar measuring system according to the embodiment of FIG. 1.

FIG. 3 is a schematic view of a calibration unit 300 of the double ball-bar measuring system 100 (labeled in FIG. 5) according to the embodiment of FIG. 1. The calibration unit is made of material having near-zero coefficient of thermal expansion. It is preferable that the material has a coefficient of thermal expansion smaller than 1.0 ppm/° C. In an embodiment of the present disclosure, the calibration unit is made of ZERODUR® or quartz glass. In this disclosure, the reference center distance $D_r$ is the distance between the centers of two balls disposed on two supporting members of the calibration unit. When a double ball-bar is disposed on two supporting members of the calibration unit, the displacement sensor measures a reference displacement amount, and the center distance of the double ball-bar is set equal to the corresponding reference center distance. The calibration unit is used to initialize each double ball-bar, or more exactly to establish the relationship between the center distance and the displacement amount. The calibration unit has at least three supporting members on it, and provides more than or equal to two reference center distances. According to the embodiment in FIG. 3, the calibration unit 300 has five supporting members 301 and can provide three, four, five or maximal six reference center distances. It is advantageous that the minimal and maximal center distance of the double ball-bar are provided by the calibration unit, so that the whole measurement range is calibrated. The calibration unit 300 may be placed on a horizontal plane or on a tilted plane with angle A as shown in FIG. 3.

Figure 4B:
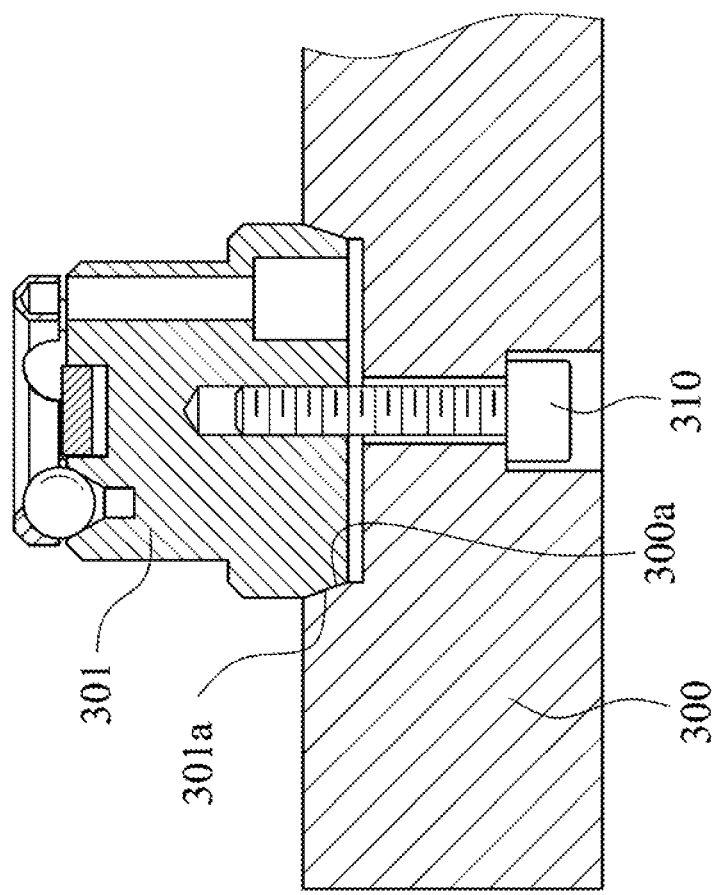
FIG. 4B is a cross-sectional view of the supporting member disposed on the calibration unit according to the embodiment of FIG. 3.

FIG. 4A is a schematic view of the supporting member 301 according to the embodiment of FIG. 3. FIG. 4B is a cross-sectional view of the supporting member 301. As shown in FIG. 4A and FIG. 4B, the supporting member 301 is a magnetic ball socket having a magnet in the center and includes three balls to support a measuring ball placed thereon at three points. Other arrangements are also possible to provide the three-point support, for example using three rollers instead of balls. Glue or adhesive can be used to connect the supporting member 301 and the calibration unit 300, but it is preferable to have locating means so that the location of the supporting member 301 is determined by geometries on the calibration unit 300. The location of each supporting member 301 will be well-defined, repeatable and durable. The reference center distances provided by the calibration unit will also be stable and accurate. According to one embodiment in FIG. 3, the double ball-bar measuring system further includes a locating or centering means for fixing each supporting member on the calibration unit. In FIG. 4, the locating means includes two matched taper surfaces. The calibration unit 300 has a plurality of holes, each with an inner taper surface 300a. The supporting member 301 has a corresponding outer taper surface 301a. The taper surfaces 301a and 300a are forced to match by a fastening screw 310 in FIG. 4B, so that the supporting member 301 is centered and fixed securely on the calibration unit 300.

Figure 5:
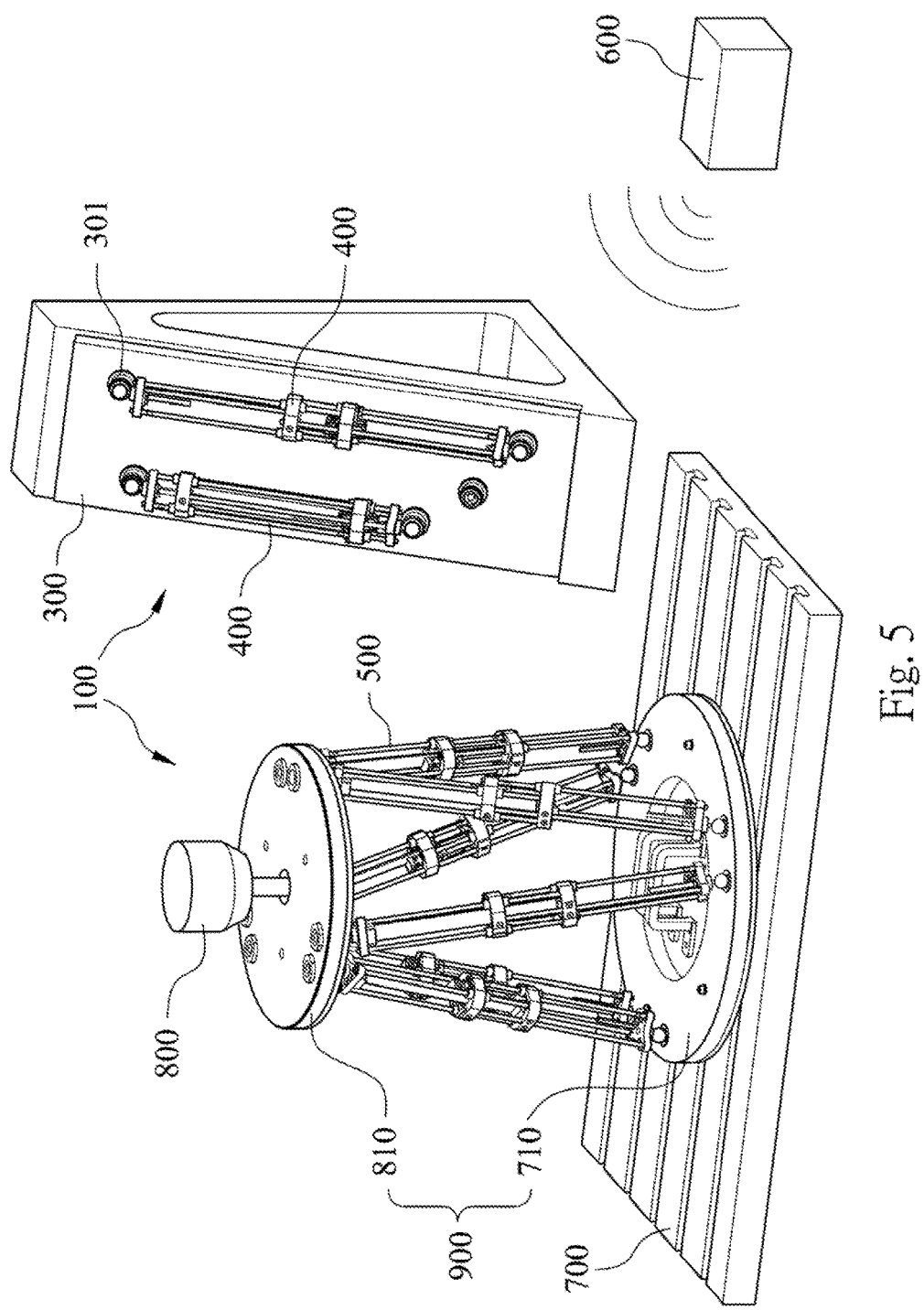
FIG. 5 is a schematic view of a double ball-bar measuring system according to an embodiment of the present disclosure.

FIG. 5 shows one embodiment of the double ball-bar measuring system 100. The high precision hexapod measurement apparatus 900 includes a first structure 710, a second structure 810 and the double ball-bar measuring system 100. The double ball-bar measuring system 100 includes eight double ball-bars 200, and a calibration unit 300. All eight double ball-bars 200 are the same in design, but different in function. Among the double ball-bars, six are measuring double ball-bars 500 and two are reference double ball-bars 400. The target machine is a machine tool schematically represented by a tool holder 800 and a work table 700. The first structure 710 of the high precision hexapod measurement apparatus 900 is fixed on the work table 700. The second structure 810 is installed on the tool holder 800. The high precision hexapod measurement apparatus 900 is used to calibrate the motional errors of the work table 700 relative to the tool holder 800. In FIG. 5, the calibration unit 300 includes five supporting members 301, whereby the two supporting members 301 at the right side define a maximal reference center distance and the other two supporting members at the left side define a minimal reference center distance. Two reference double ball-bars 400 are disposed on the calibration unit 300, one has a maximal and the other a minimal center distance.

The relative position and orientation between the first structure 710 and the second structure 810 are to measure by the hexapod measurement apparatus 900. The measuring double ball-bars 500 of the hexapod measurement apparatus 900 are tilt at an angle, and their mean tilt angle can be found by analyzing the kinematics of the hexapod. It is advantageous that the calibration unit 300 is on a tilted plane with a tilt angle equal to the mean tilt angle of the measuring double ball-bars 500. Further, it is preferable that the center distance function of each measuring double ball-bar is established at this mean tilt angle.

In one embodiment of the present disclosure, the initialization of double ball-bars is performed near the machine tool under room temperature. The initialization begins by disposing a double ball-bar on two supporting members 301 of the calibration unit 300, whereby a reference displacement amount is measured. The center distance $D_c$ of the double ball-bar is set equal to the reference center distance $D_r$ defined by the two supporting members 301. The reference center distance $D_r$ and the corresponding reference displacement amount n define a calibration point $P=(D_r, n)$.

Based on at least two calibration points, a center distance function can be established for the double ball-bar, which describes the relationship between the measured displacement amount and the center distance. The center distance function can be a data table, which provides data for the compensation of error in center distance. The center distance function can also be a parametric function, or any function which outputs a center distance from an input of displacement amount. Besides, the tilt angle A of the double ball-bar can also be an input parameter of the center distance function.

In one embodiment of the present disclosure, the center distance function is a polynomial function of degree two (order three). The center distance function can be represented as follows.

$$D(n)=a(nk)^2+b(nk)+c \qquad (1)$$

Wherein k is the resolution of the displacement sensor 207, and n is the displacement amount. If three reference center distances are available, the three unknown coefficients a, b and c can be solved explicitly. In case that the reference center distance $D_r$ is the minimal center distance, the corresponding reference displacement amount can be set to zero (n=0). The coefficient c is then equal to the minimal distance $D_{min}$. The polynomial function D(n) can also be obtained by other algorithms such as curve fitting algorithm. In this case the number of the calibration points is larger than the order (degree+1) of the polynomial function D(n).

Figure 6A:
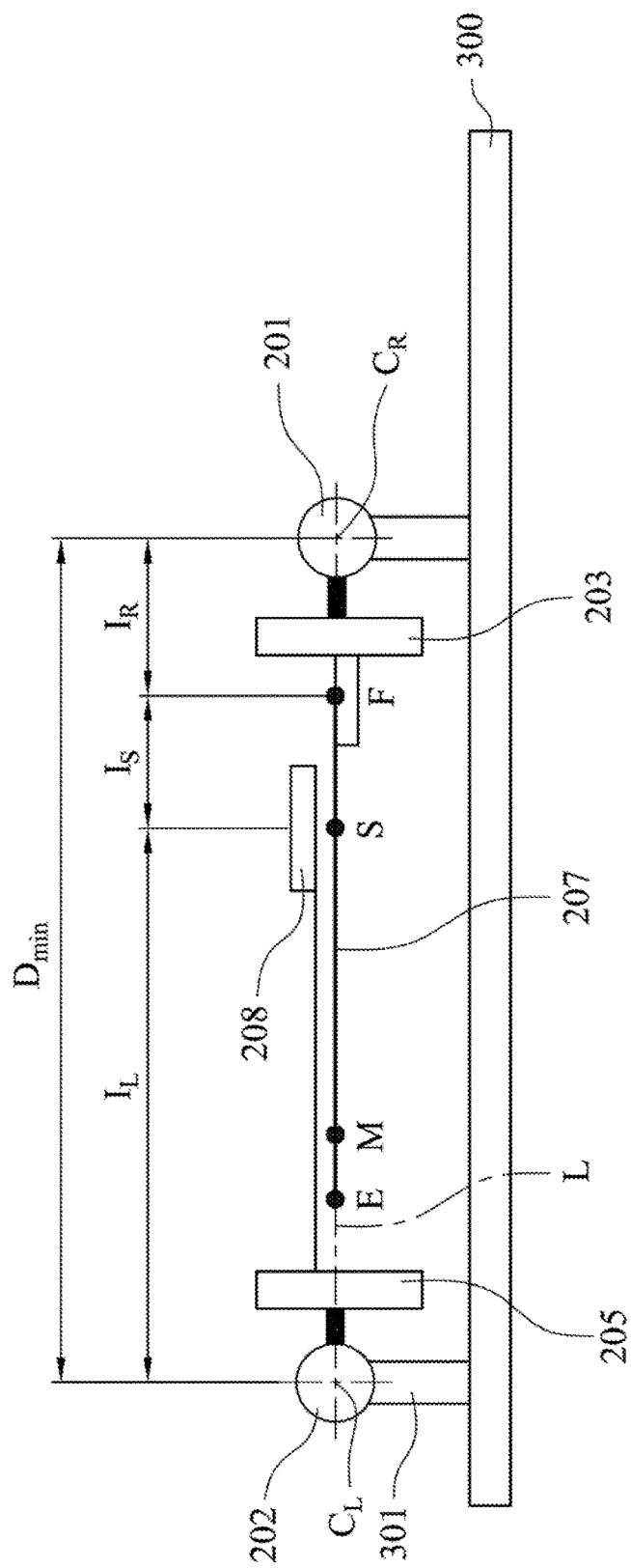
FIG. 6A is a thermal error model for the double ball-bar of FIG. 1 with minimal center distance.
Figure 6B:
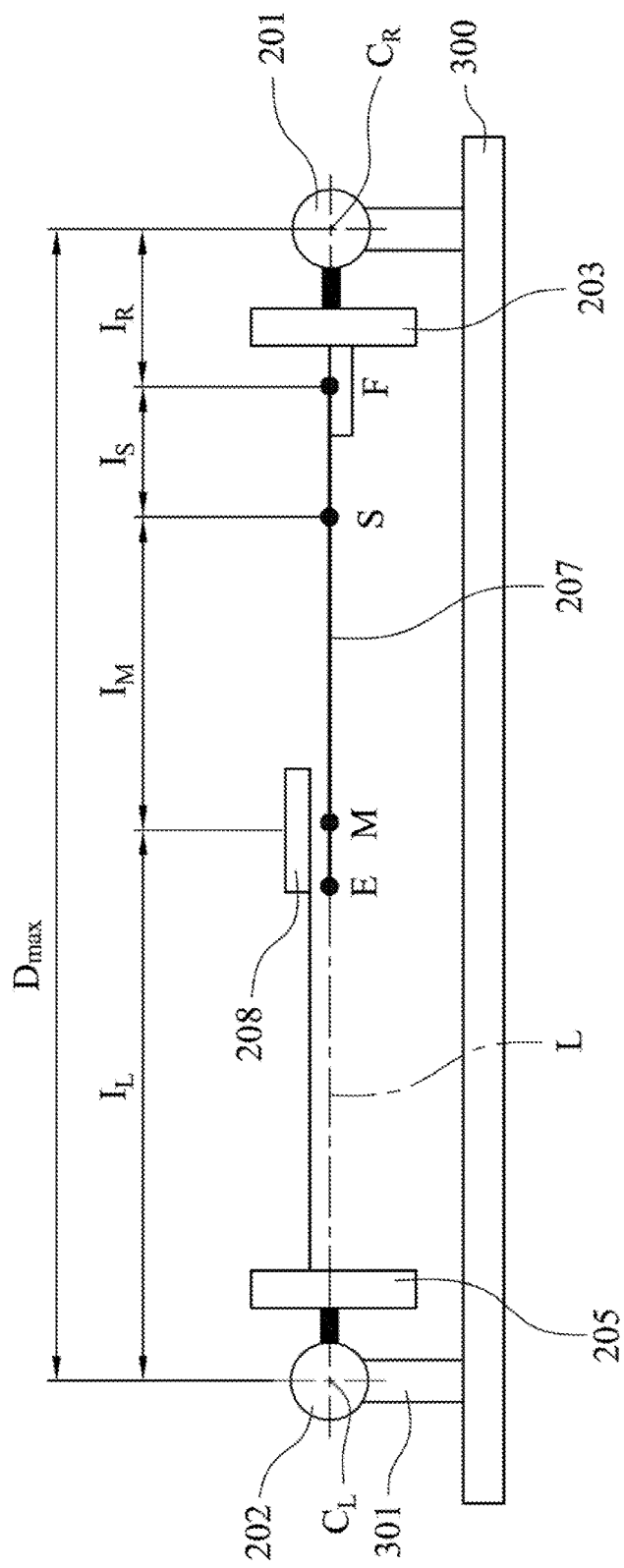
FIG. 6B is a thermal error model for the double ball-bar of FIG. 1 with maximal center distance.
Figure 6C:
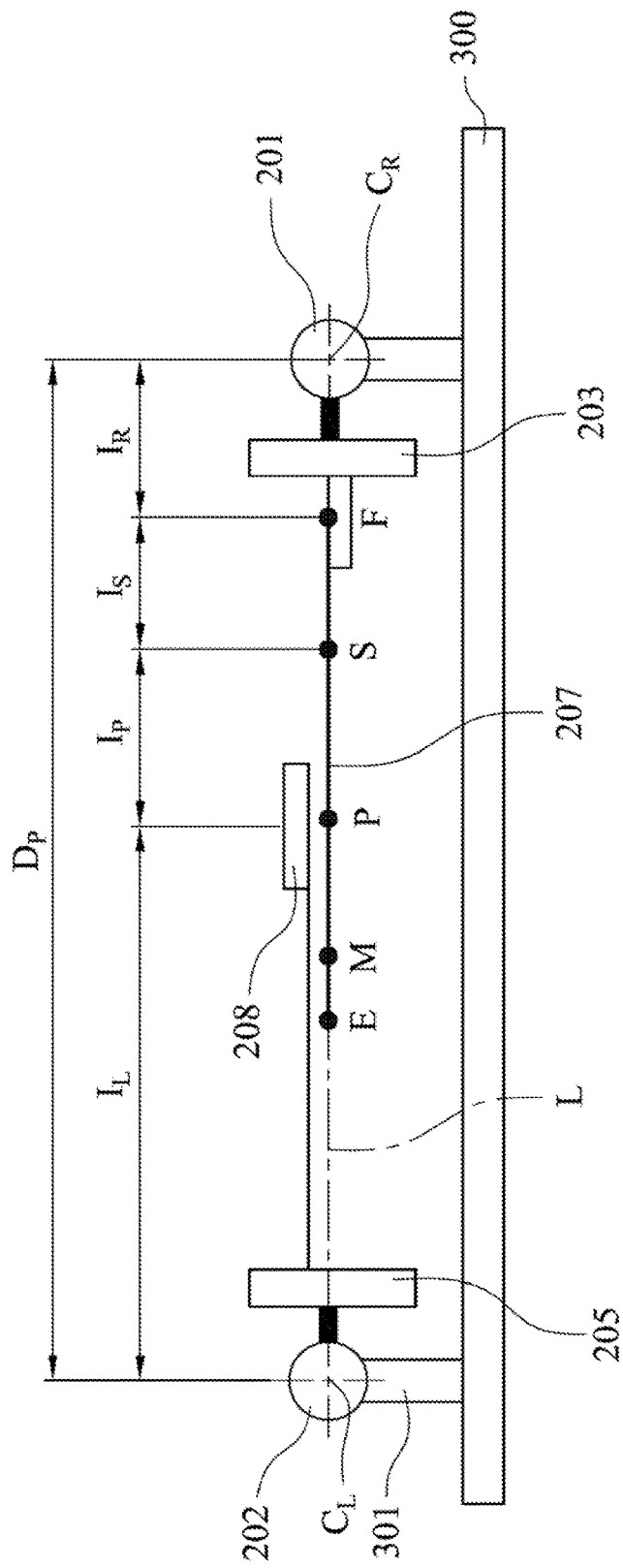
FIG. 6C is a thermal error model for the double ball-bar of FIG. 1 with intermediate center distance.

The double ball-bar 200 in FIG. 1 has a useful feature for the thermal error compensation. FIGS. 6A-6C schematically illustrate the thermal error model of the double ball-bar of FIGS. 1 and 5 having the minimal, maximal and intermediate reference center distance $D_{min}$, $D_{max}$ and $D_p$, respectively. In FIGS. 6A-6C, the schematically illustrated calibration unit 300 is made of material having near-zero thermal expansion coefficient. Therefore, the expansion or contraction of the calibration unit 300 is ignorable when the ambient temperature varies in a predefined range, and all reference center distances $D_r$ will remain constant despite of a changing ambient temperature. A change of the displacement reading of the reference double ball-bar on the calibration unit 300 represents the thermal effects of the ambient temperature and the readhead on the reference double ball-bar. In the present disclosure, the measured thermal error of the reference ball-bar 400 is called thermal error amount.

In FIG. 6A, the minimal reference center distance is expressed as $D_{min}$. The readhead 208 is right over a starting point S of the optical linear scale 207. The optical linear scale 207 is fixed on the ball base 203 of the scale assembly at point F, wherein the left end E of the optical linear scale 207 can freely expand or contract relative to the fixed end F. The distance between the readhead 208 and the ball center $C_L$ of the measuring ball 202 is $I_L$. The distance between the starting point S and the fixed end F of the optical linear scale is $I_S$, and the distance between the fixed end F and the center $C_R$ of the measuring ball 201 is $I_R$. Ignoring the errors of the double ball-bar 200 caused by geometric errors and deflection, the minimal center distance is the sum of following lengths: $D_{min}=I_{min}=I_L+I_S+I_R$. Thus, the thermal error of a double ball-bar 200 having minimal center distance can be expressed as follows.

$$\delta D_{min}=\delta I_{min}=\delta I_L+\delta I_S+\delta I_R \qquad (2)$$

In FIG. 6B, the maximal center distance is expressed as $D_{max}$. The readhead 208 is on the measuring point M and the distance between the measuring point M and the starting point S is $I_M$. The measuring range is between points S and M. It is clear that $D_{max}=I_{max}=D_{min}+I_M$. The thermal error of a double ball-bar 200 having maximal center distance can be expressed as follows.

$$\delta D_{max}=\delta I_{max}=\delta D_{min}+\delta I_M \quad (3)$$

In FIG. 6C, the readhead 208 is on an intermediate measuring point P, the distance between the starting point S and the measuring point P is the scale length $I_P$, the center distance of the double ball-bar 200 is $D_p$, wherein $0 \le I_P \le I_M$.

The thermal error of a double ball-bar can be obtained by building a thermal error model, which describes the relationship between the thermal error and the actual ambient temperature. In the present disclosure, at least one reference double ball-bar is used to measure the thermal error. The basic theory of the reference double ball-bar is described as follows. Assume that the equivalent coefficient of thermal expansion of the double ball-bar having the minimal center distance $D_{min}$, is $\alpha$. Assume that the coefficient of thermal expansion of the optical linear scale 207 is $\beta$. Considering the thermal error model of the double ball-bar as a first order dynamic system, and assume the ambient temperature raises in stepwise $\Delta T°$ C. Assume the time constant of the thermal error model is $T_R$ for the double ball-bar having the minimal center distance $D_{min}$, and $T_S$ for the optical linear scale 207. The thermal errors of the double ball-bars in FIG. 6A to FIG. 6C can be expressed as follows.

$$\delta D_{min} = \alpha I_{min} \Delta T \left(1 - e^{-\frac{1}{T_R}}\right) \quad (4)$$

$$\delta D_{max} = \alpha I_{min} \Delta T \left(1 - e^{-\frac{1}{T_R}}\right) + \beta I_M \Delta T \left(1 - e^{-\frac{1}{T_S}}\right) \quad (5)$$

$$\delta D_P = \alpha I_{min} \Delta T \left(1 - e^{-\frac{1}{T_R}}\right) + \beta I_P \Delta T \left(1 - e^{-\frac{1}{T_S}}\right) \quad (6)$$

When the time approaches infinity, the exponential parts of the equations are as follows:

$$\lim_{t \to \infty} \left(1 - e^{-\frac{1}{T_S}}\right) = 1 \quad (7)$$

$$\lim_{t \to \infty} \left(1 - e^{-\frac{1}{T_R}}\right) = 1 \quad (8)$$

The stationary thermal errors of the double ball-bars having minimal, maximal and intermediate center distances are as follows:

$$\delta D_{min}=\alpha I_{min}\Delta T \quad (9)$$

$$\delta D_{max}=\alpha I_{min}\Delta T+\beta I_M \Delta T \quad (10)$$

$$\delta D_p=\alpha I_{min}\Delta T+\beta I_P \Delta T \quad (11)$$

Equations (4)-(6) and (9)-(11) show that the thermal error $\delta D_p$ of a double ball-bar having any center distance $D_p$ is the sum of the common thermal error $\delta D_{min}=\alpha I_{min}\Delta T$ and the thermal error of the linear scale. In one embodiment of the present disclosure, the common thermal error $\delta D_{min}$ is measured by a reference double ball-bar having a minimal center distance $D_{min}$. The measured common thermal error is called thermal error amount and is used to compensate thermal errors of the measuring double ball-bars. Besides, from equation (9) the stationary temperature $\Delta T$ can be calculated from the measured common thermal error $\delta D_{min}$ as follow:

$$\Delta T=\delta D_{min}/(\alpha I_{min})=\delta D_{min}/(\alpha D_{min}) \quad (12)$$

To ensure that the common thermal error $\delta D_{min}$ is optimal for the thermal error compensation, experiments can be conducted to find out thermal errors of double ball-bars in accordance with an ambient temperature change. The double ball-bar having the thermal error closest to the mean thermal error of all double ball-bars is used as reference double ball-bar. The difference between the thermal error of the reference double ball-bar and the thermal error of each of the measuring double ball-bars can be reduced to within a given tolerance, for example 1 micrometer.

In case that the optical linear scale 207 is made of ZERODUR®, the coefficient of thermal expansion $\beta$ is almost zero, $\beta \approx 0$, so that the thermal error of the optical linear scale is ignorable, $\beta I_P \Delta T = 0$. Therefore, the thermal error $\delta D_p$ of a double ball-bar having any center distance $D_p$ is equal to common thermal error $\delta D_{min}$, $\delta D_p = \delta D_{min}$. The measured thermal error amount $\delta D_{min}$ of a reference double ball-bar is the thermal error of all measuring double ball-bars.

In another case, the optical linear scale 207 is not made of ZERODUR, $\beta \ne 0$. The overall thermal error consists of two components, one is the common thermal error $\delta D_{min}$ and the other is the thermal error of the optical linear scale $\beta I_P \Delta T$. The thermal error resulting from the change of resolution is ignorable. The minimal center distance $I_{min}=D_{min}$, the scale length $I_p$ and the coefficients $\alpha$ and $\beta$ determine an error ratio $\varepsilon = \beta I_p/\alpha D_{min}$. In one embodiment of the present disclosure, to fully compensate the thermal error of a measuring double ball-bar having a center distance $D_p$, the error ratio $\varepsilon$ is calculated firstly, then the thermal error of the optical linear scale is calculated as $\varepsilon \cdot \delta D_{min}$. In this case, one reference double ball-bar of minimal center distance $D_{min}$ is also enough to compensate thermal error of a measuring double ball-bar of any center distance. Similarly, if the reference double ball-bar has a center distance other than the minimal center distance $D_{min}$, the thermal error of the optical linear scale of a measuring double ball-bar can also be calculated and compensated. The above described method is valid for double ball-bars having a linear scale, for example optical or magnetic linear scale.

In another embodiment of the present disclosure in FIG. 5, two reference double ball-bars having a minimal and a maximal center distance are disposed on the calibration unit 300 and two thermal error amounts $\delta D_{min}$ and $\delta D_{max}$ are measured. The thermal error $\delta D_p$ of a measuring double ball-bar of any distance $D_p$ can be determined by a linear interpolation of the measured thermal error amounts as follows:

$$\delta D_p=\delta D_{min}+(\delta D_{max}-\delta D_{min})*((D_p-D_{min})/(D_{max}-D_{min})). \quad (13)$$

This equation shows the thermal error $\delta D_p$ of a measuring double ball-bar of any center distance $D_p$ can be obtained from the measured thermal error amounts $\delta D_{min}$ and $\delta D_{max}$.

In FIG. 5, the six measuring double ball-bars 500 and the two reference double ball-bars 400 are under the influence of the same ambient temperature. When the target machine is driven, the tool holder 800 and the second structure 810 move relative to the first structure 710 and the work table 700. Six displacement amounts of the measuring double ball-bars 500 are measured. The measuring module 600 receives the displacement amounts of the measuring double ball-bars 500 and the thermal error amounts of the two reference double ball-bars 400, and determines the center distance of each of the measuring double ball-bars 500 in accordance with its center distance function and displacement amount. Thereafter, the center distance of each of the measuring double ball-bars 500 is compensated in accordance with the thermal error amounts $\delta D_{max}$ and $\delta D_{min}$ of the two reference double ball-bars 400.

The double ball-bar can be initialized either in a metrology laboratory at a specified temperature or in workshop near the target machine at room temperature. The temperature by the initialization of a double ball-bar is the base temperature for a zero thermal error. The initialized center distance function is valid only for the base temperature. In one embodiment of the present disclosure, the initialization of double ball-bars is performed in a metrology laboratory and the base temperature for a zero thermal error is 20° C. By disposing a double ball-bar 400 or 500 under the room temperature on the calibration unit, the double ball-bar measures an initial thermal error amount. This initial thermal error amount is caused by the temperature change from the base temperature to the room temperature and can be used to calculate the temperature gap, see equation (12).

The disclosed method for the thermal error compensation can apply to double ball-bar having either absolute or incremental encoder. If the double ball-bar is an incremental one, it is preferable that the encoder provides a zero reference signal. The zero reference signal can be used to preset the reference displacement amount. For example, the reference displacement amount $n_{min}$ can be set equal to quotient of the following division: $n_{min}=D_{min}/k$, whereby k is the resolution of the displacement sensor.

Figure 7:
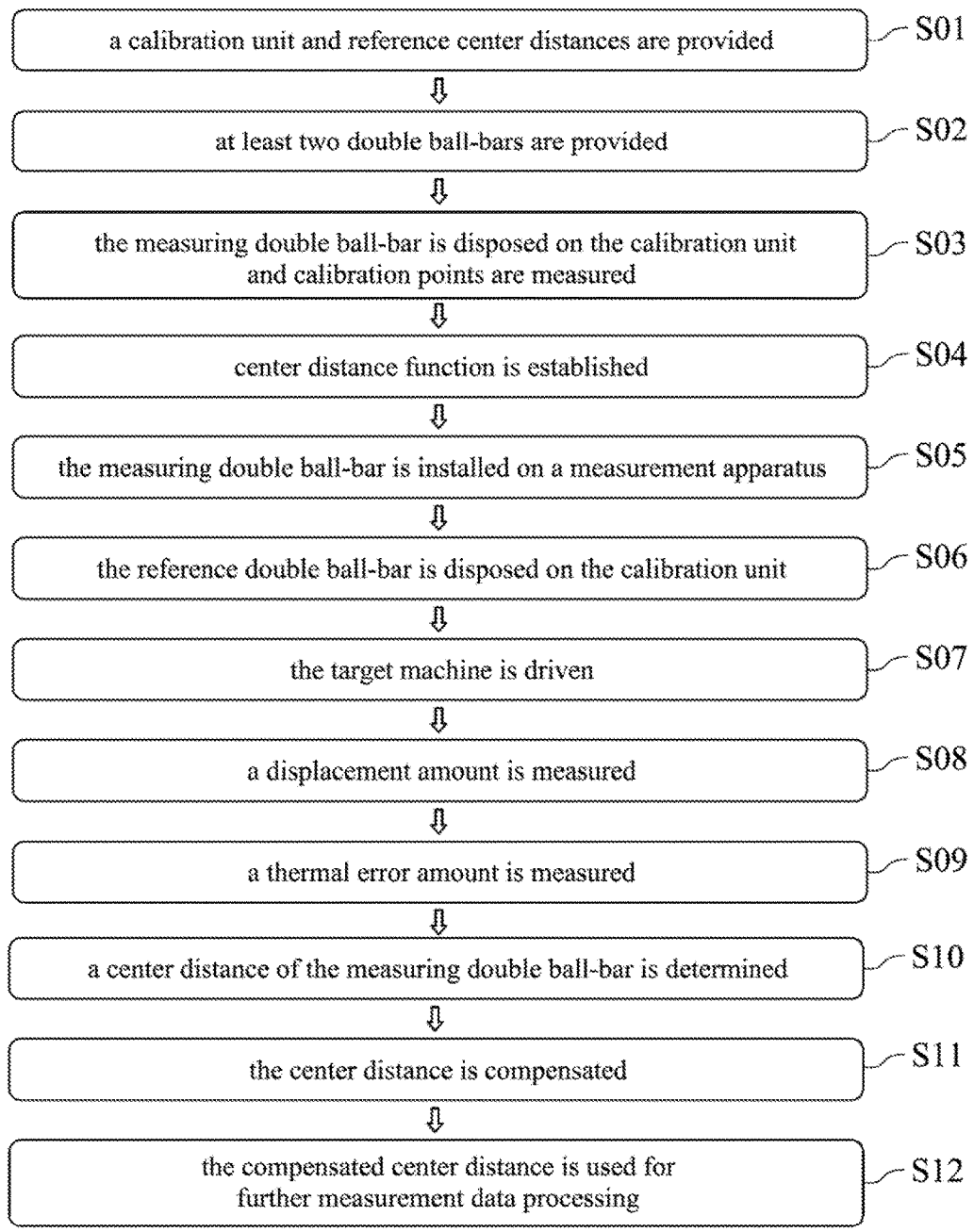
FIG. 7 is a flow chart showing an errors compensation method for a double ball-bar measuring system according to another embodiment of the present disclosure.

FIG. 7 is a flow chart showing an errors compensation method of a double ball-bar measuring system 100 according to another embodiment of the present disclosure, wherein the measurement apparatus can be the hexapod measurement system 900 in FIG. 5, but not limited thereto. The errors compensation method includes following steps. In Step S01, a calibration unit 300 including at least three supporting members 301 and at least two reference center distances are provided. In Step S02, at least two double ball-bars are provided; in detail, at least one double ball-bar as measuring double ball-bar for use in a measurement apparatus and at least one double ball-bar as reference double ball-bar are provided. In Step S03, the measuring double ball-bar is disposed on the calibration unit, and at least two calibration points are measured. In Step S04, a center distance function of the measuring double ball-bar is established in accordance with the calibration points, wherein the center distance function can be a data table or a parametric function, or a polynomial function. In Step S05, the measuring double ball-bar is installed on a measurement apparatus to measure or calibrate a target machine. In Step S06, the reference double ball-bar is disposed on the calibration unit. In Step S07, the target machine is driven for a measurement or a calibration. In Step S08, a displacement amount of the measuring double ball-bar is measured. In Step S09, a thermal error amount of the reference double ball-bar is measured in accordance with an ambient temperature. In Step S10, a center distance of the measuring double ball-bar in accordance with the center distance function and the displacement amount is determined. In Step S11, the center distance is compensated in accordance with the thermal error amount. In Step S12, the compensated center distance is used for further measurement data processing.

Figure 8:
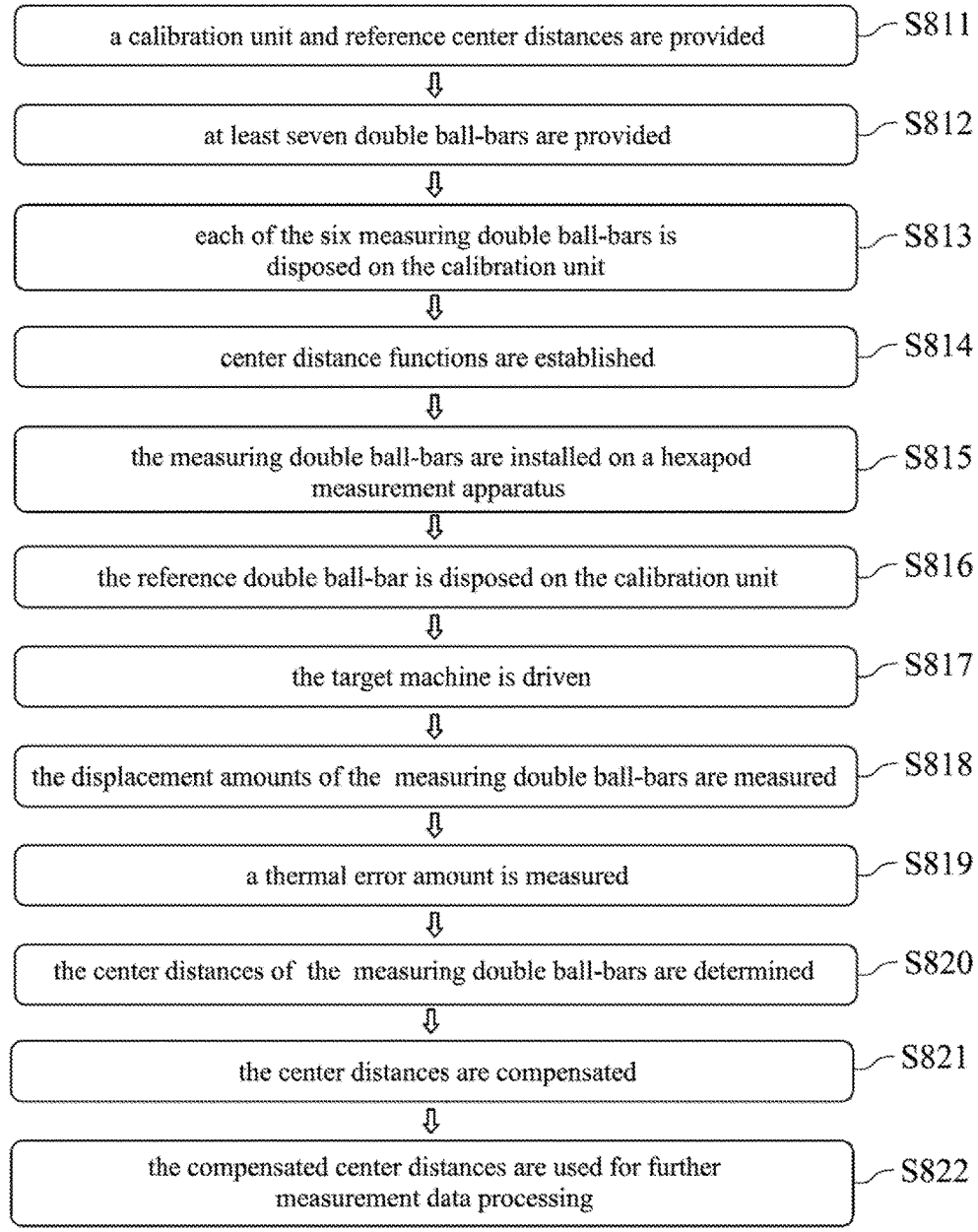
FIG. 8 is a flow chart showing an errors compensation method for a double ball-bar measuring system according to another embodiment of the present disclosure, whereby the measurement apparatus is a hexapod measurement apparatus having six measuring double ball-bars.

Further, according to another embodiment in FIG. 8, several steps of the errors compensation method are different from the embodiment of FIG. 7 as follows. In step S812, at least seven double ball-bars are provided, so that, in the errors compensation method of FIG. 8, the measurement apparatus includes six measuring double ball-bars and at least one reference double ball-bar. In step S813, each of the six measuring double ball-bars is disposed on the calibration unit to define calibration points, and in step 814, center distance functions of each of the six measuring double ball-bars are established in accordance with the calibration points. In step S815, the six measuring double ball-bars are installed on a hexapod measurement apparatus for measurement or calibration of the target machine. In step S817, the target machine is driven a measurement or a calibration, and in step S818, the displacement amounts of the measuring double ball-bars are measured. In step S820, the center distances of the measuring double ball-bars are determined in accordance with the center distance functions and the displacement amounts. Then, in step S821, each of the center distances is compensated in accordance with the thermal error amount, and in step S822, the compensated center distances are used for further measurement data processing. Steps S811, S816, S819 are the same as stated in the embodiment of FIG. 7, and will not described again herein.

Figure 9:
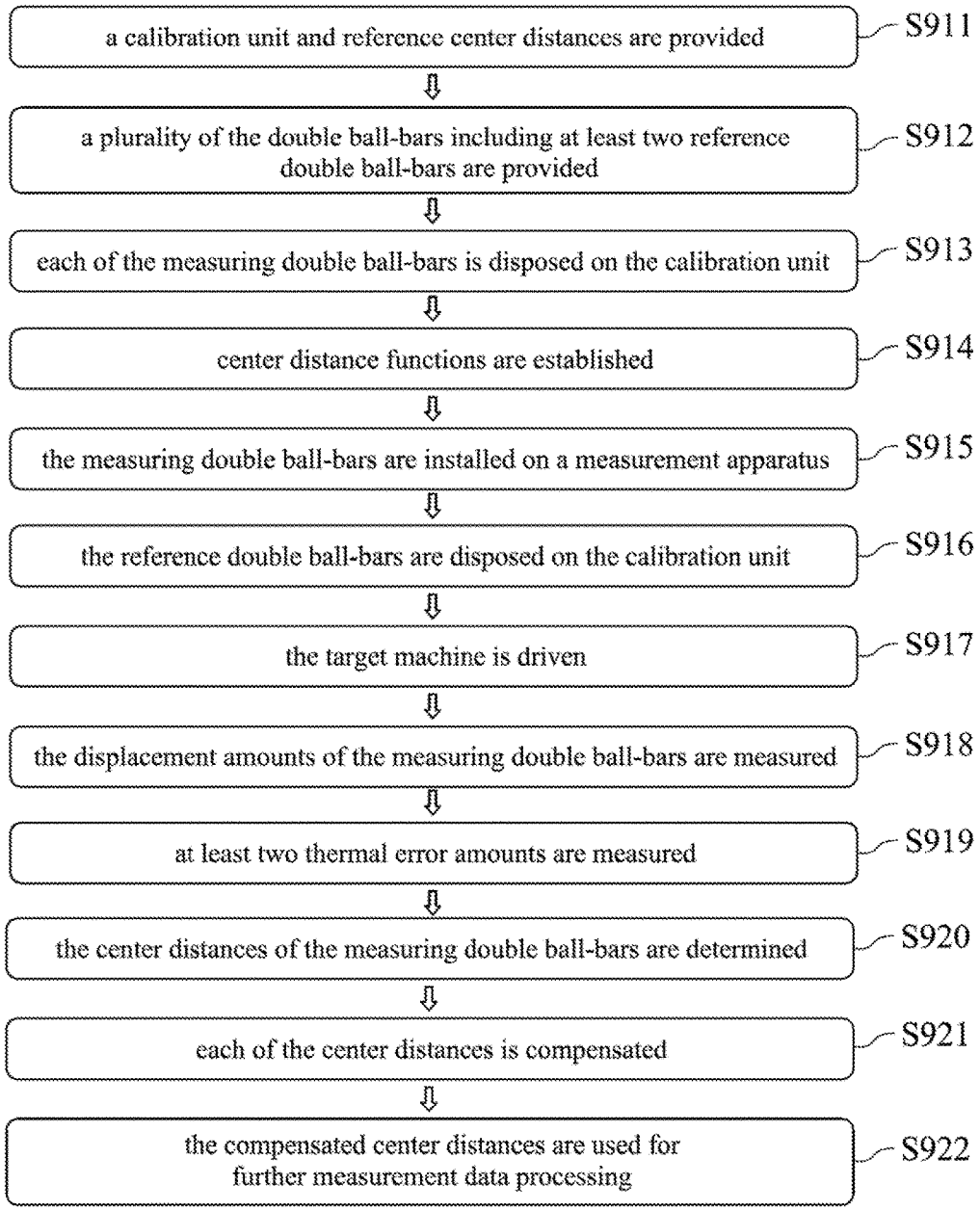
FIG. 9 is a flow chart showing an errors compensation method for a double ball-bar measuring system having two reference double ball-bars according to another embodiment of the present disclosure.

Further, according to yet another embodiment in FIG. 9, several steps of the errors compensation method are different from the embodiments of FIG. 7 and FIG. 8 as follows. In step S911, a calibration unit and at least two reference center distances are provided, wherein the calibration unit can include a plurality of supporting members; in detail, the calibration unit includes five supporting members. In step S912, a plurality of the double ball-bars are provided which includes a plurality of the measuring double ball-bars and at least two reference double ball-bars. In step S916, the at least two reference double ball-bars are disposed on the supporting members of the calibration unit. In step S919, at least two thermal error amounts of the reference double ball-bars are measured. Then, in step S921, each of the center distances is compensated by a linear interpolation of the thermal error amounts, and in step S922, the compensated center distances are used for further measurement data processing. Steps S913, S914, S915, S917, S918, S920 are the same as stated in the embodiments of FIG. 7 and FIG. 8, and will not described again herein.

According to the foregoing embodiments, the advantages of the present disclosure are summarized as follows: 1. The parallel connecting bars and the linear bearings of the double ball-bar provide accurate linear guide and optimal stiffness. The thermal errors of the double ball-bar is reduced by using material of low or near-zero coefficient of thermal expansion. 2. The center distance function describes the relationship between the displacement amount and the center distance, thereby compensates all geometric errors. 3. Although the thermal behaviors of measuring double ball-bars are complicated, their thermal errors can be obtained and accurately compensated by using one or two reference double ball-bars.

The present disclosure can efficiently compensate geometric and thermal errors of double ball-bars in a measurement apparatus or machine. The center distance function and the reference double ball-bar can apply to double ball-bars having other structure or using other displacement sensor. It will be apparent to those skilled in the art that various modifications and variations can be made to the present disclosure without departing from the scope or principle of the present disclosure. For example, a magnetic linear scale or LVDT can be used instead of the optical linear scale. The double ball-bar can have the structure of a telescopic cylinder. In view of the foregoing, it is intended that the present disclosure cover modifications and variations of this disclosure provided they fall within the scope of the following claims.

What is claimed is:

1. A double ball-bar measuring system comprising a calibration unit, at least two double ball-bars and a measuring module, among the double ball-bars at least one double ball-bar being a measuring double ball-bar and at least one double ball-bar being a reference double ball-bar, wherein:
   the calibration unit comprises at least three supporting members and provides at least two reference center distances;
   the measuring double ball-bar is installed on a measurement apparatus to measure or calibrate a target machine, and when the target machine is driven for a measurement or a calibration, the measuring double ball-bar measures a displacement amount;
   the reference double ball-bar is disposed on two supporting members of the calibration unit and measures a thermal error amount in accordance with an ambient temperature; and
   the measuring module processes the displacement amount and the thermal error amount, compensates the geometric and thermal errors of the measuring double ball-bar and performs measurement data processing.

2. The double ball-bar measuring system of claim 1, wherein a displacement sensor of each of the double ball-bars is LVDT, laser interferometer, linear optical or magnetic encoder.

3. The double ball-bar measuring system of claim 2, wherein the displacement sensor of each of the double ball-bars provides at least one home reference signal.

4. The double ball-bar measuring system of claim 1, wherein each of the double ball-bars using a linear scale for a displacement sensing comprises a readhead assembly and a scale assembly, each of the readhead assembly and the scale assembly comprises at least three connecting bars parallel to each other.

5. The double ball-bar measuring system of claim 4, wherein the linear scale is made of INVAR®, Super INVAR®, quartz glass or ZERODUR®.

6. The double ball-bar measuring system of claim 4, wherein the connecting bars are made of INVAR®, Super INVAR®, quartz glass or ZERODUR®.

7. The double ball-bar measuring system of claim 4, wherein a stress releasing means is provided in the scale assembly to reduce a thermally induced stress.

8. The double ball-bar measuring system of claim 7, wherein the stress releasing means is an elastic element or a form-fit element.

9. The double ball-bar measuring system of claim 1, wherein each supporting member supports a measuring ball placed thereon at three contact points.

10. The double ball-bar measuring system of claim 9, wherein the calibration unit comprises three balls or rollers for a three-point support.

11. The double ball-bar measuring system of claim 1, wherein the calibration unit is made of material having a coefficient of thermal expansion smaller than 1.0 ppm/° C.

12. The double ball-bar measuring system of claim 11, wherein said material includes ZERODUR® or quartz glass.

13. The double ball-bar measuring system of claim 1, further comprising:
   a locating or centering means for fixing the supporting members on the calibration unit.

14. The double ball-bar measuring system of claim 13, wherein said means comprises two matched taper surfaces, one taper surface is located on a hole of the calibration unit, the other on the supporting member.

15. The double ball-bar measuring system of claim 1, wherein the calibration unit provides three, four, five or six reference center distances.

16. The double ball-bar measuring system of claim 1, wherein six measuring double ball-bars are used for a hexapod measurement apparatus or machine.

17. The double ball-bar measuring system of claim 1 or 16, wherein the calibration unit is on a tilt plane.

18. The double ball-bar measuring system of claim 16, wherein the double ball-bar having a thermal error closest to the mean thermal error of all double ball-bars is used as reference double ball-bar.

19. The double ball-bar measuring system of claim 18, wherein the difference between the thermal error of the reference double ball-bar and the thermal error of each of the measuring double ball-bars in accordance with the ambient temperature is within 1 micrometer.

20. The double ball-bar measuring system of claim 1 or 16, further comprising another reference double ball-bar and another thermal error amount is used for the compensation of thermal errors of the measuring double ball-bars.

21. An errors compensation method of a double ball-bar measuring system, comprising:
   providing a calibration unit comprising at least three supporting members and providing at least two reference center distances;
   providing at least two double ball-bars, wherein at least one double ball-bar is a measuring double ball-bar and at least one double ball-bar is a reference double ball-bar;
   disposing the measuring double ball-bar on the calibration unit and measuring at least two calibration points;
   establishing a center distance function of the measuring double ball-bar in accordance with the calibration points;
   installing the measuring double ball-bar on a measurement apparatus to measure or calibrate a target machine;
   disposing the reference double ball-bar on the calibration unit;
   driving the target machine for a measurement or a calibration;
   measuring a displacement amount of the measuring double ball-bar;
   measuring a thermal error amount of the reference double ball-bar;
   determining the center distance of the measuring double ball-bar in accordance with the center distance function and the displacement amount;
   compensating the center distance in accordance with the thermal error amount; and
   using the compensated center distance for further measurement data processing.

22. The errors compensation method of claim 21, wherein the center distance function is a data table or a parametric function.

23. The errors compensation method of claim 22, wherein the center distance function is a polynomial function.

24. The errors compensation method of claim 21, wherein the tilt angle of the measuring double ball-bar is another input parameter of the center distance function.

25. The errors compensation method of claim 21, wherein,
   providing a plurality of the measuring double ball-bars;

disposing the measuring double ball-bars on the calibration unit and measuring the calibration points of the measuring double ball-bars;

establishing the center distance function of each of the measuring double ball-bars in accordance with the calibration points;

installing the measuring double ball-bars on the measurement apparatus for measurement or calibration of the target machine;

measuring the displacement amounts of the measuring double ball-bars;

determining the center distances of the measuring double ball-bars in accordance with the center distance functions and the displacement amounts;

compensating the center distances in accordance with the thermal error amount;

using the compensated center distances for further measurement data processing.

26. The errors compensation method of claim 21, wherein, providing at least seven double ball-bars, wherein six of the double ball-bars are measuring double ball-bars;

disposing the measuring double ball-bars on the calibration unit and establishing center distance functions of the measuring double ball-bars in accordance with the reference center distances and the corresponding reference displacement amounts;

installing the measuring double ball-bars on a hexapod measurement apparatus for measurement or calibration of the target machine;

measuring the displacement amounts of the measuring double ball-bars;

determining the center distances of the measuring double ball-bars in accordance with the center distance functions and the displacement amounts;

compensating the center distances in accordance with the thermal error amount; and using the compensated center distances for further measurement data processing.

27. The errors compensation method of claim 21, 25 or 26, wherein, providing at least four supporting members;

providing at least two reference double ball-bars;

disposing the reference double ball-bars on the supporting members;

measuring at least two thermal error amounts of the reference double ball-bars; and compensating the center distance by a linear interpolation of the thermal error amounts.

\* \* \* \* \*